United States Patent [19]

Dyer

[11] Patent Number: 5,301,917
[45] Date of Patent: Apr. 12, 1994

[54] BRAKE LINE ISOLATOR

[75] Inventor: Edward P. Dyer, Germantown, Wis.

[73] Assignee: Tyton Corporation, Milwaukee, Wis.

[21] Appl. No.: 980,609

[22] Filed: Nov. 23, 1992

[51] Int. Cl.⁵ .............................................. F16L 3/08
[52] U.S. Cl. ................................... 248/74.2; 248/68.1
[58] Field of Search ................... 248/74.2, 74.3, 74.1, 248/74.5, 73, 68.1, 65; 24/543

[56] References Cited

U.S. PATENT DOCUMENTS

| | | | |
|---|---|---|---|
| 2,397,680 | 4/1946 | Morehouse | 248/74.3 X |
| 4,614,321 | 9/1986 | Andre | 248/74.2 |
| 4,669,688 | 6/1987 | Itoh et al. | 248/74.2 |
| 4,901,957 | 2/1990 | Daigle et al. | 248/65 X |

*Primary Examiner*—Ramon O. Ramirez
*Attorney, Agent, or Firm*—Michael Best & Friedrich

[57] ABSTRACT

A bracket includes a clip member having a U-shaped base. One of the clip member legs terminates in a lateral extension projecting away from other clip member leg and the other of said clip member legs terminates in a second normally oriented to extend beyond and spaced from that lateral extension. That other leg is flexible to allow second extension to be moved into engagement with said lateral extension in which orientation a releasable interlocking engagement between the two extensions. A generally U-shape liner is nested within the clip member and has spaced legs extending generally along respective ones of the legs of the clip member. When the second and lateral extensions are in engagement the clip member and liner are interengaged so as to be held against relative movement in X, Y, and Z directions. The lateral and second extensions are constructed to accommodate mounting the bracket to a mounting surface.

14 Claims, 1 Drawing Sheet

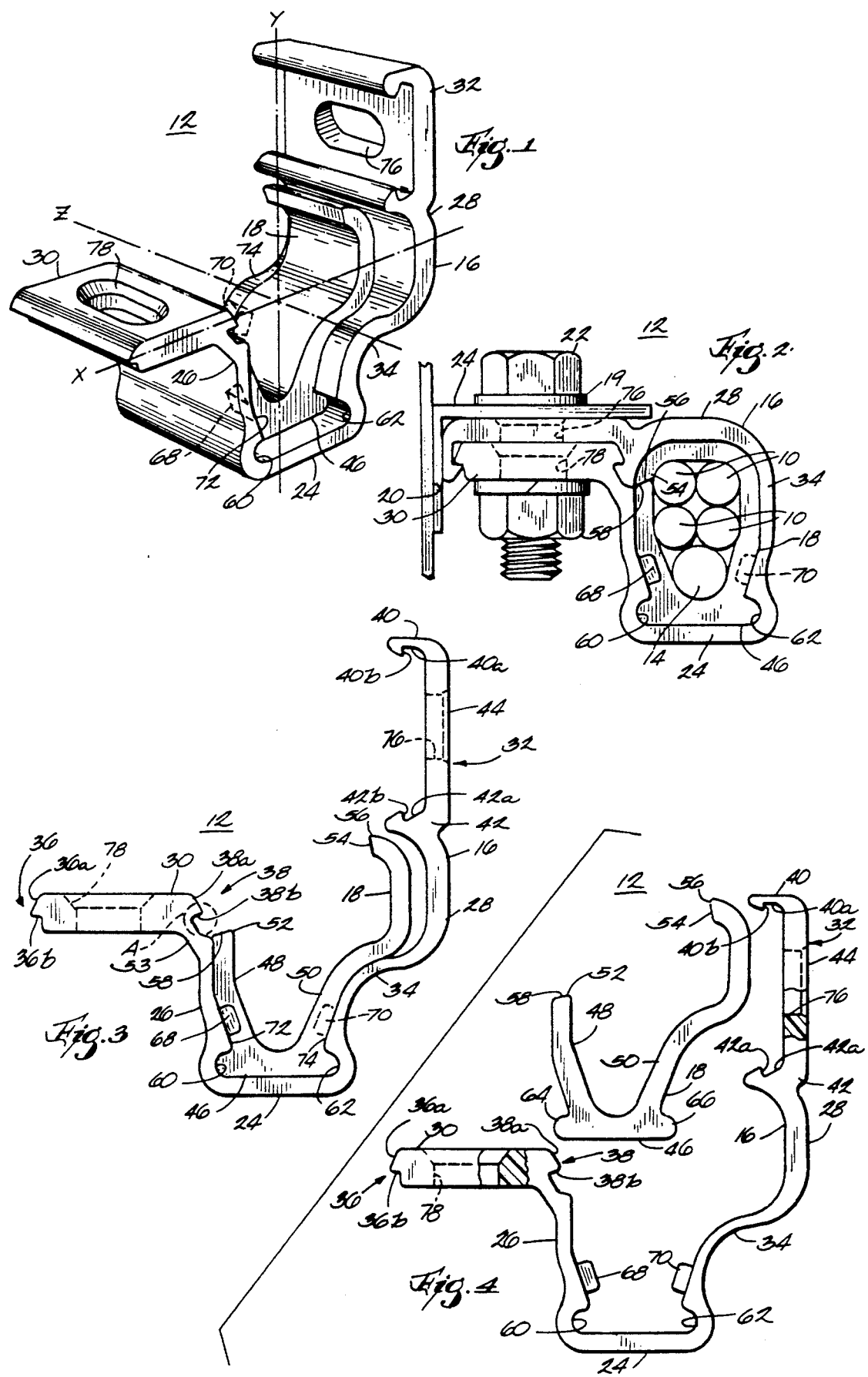

BRAKE LINE ISOLATOR

BACKGROUND OF THE INVENTION

This invention relates to bracket devices for holding elongated elements securely and compactly in their operational environment.

It has been a long recognized need in the area of assembling elongated control elements, for example, brake cables and the like, that they be securely and compactly mounted in their operational environment by a releasable bracket. Numerous arrangements of elements and bracket constructions have been proposed. Brackets for mounting elongated elements are customarily used in operating environments wherein they are required to endure millions of repetitive stresses. For example, brackets used in automotive applications to hold brake lines, brake cables and fuel lines are constantly subjected to engine and road travel induced by vibrations. Therefore, it is known that such brackets must be made of a strong material to provide a required rigidity and structural strength over a life of many years. However, such strong durable bracket materials do not compress and conform to the shape of the elongated element or elements to be held. To solve this conformity problem it has been the practice to precisely configure the holding space within the bracket to conform exactly to the shape of the elongated element or elements to be held. Such conformity is necessary because if the elongated element or elements are not tightly held they will vibrate within the bracket which results in noise and rubbing which produces wear that can damage and destroy the elongated element or elements being held especially those conveying liquids. While precisely configuring the bracket is one satisfactory way of holding the elongated elements such precise configuration results in the bracket being only usable for the specific control element that it was designed to hold. Whenever the shape or the number of elongated elements to be held is varied a new bracket is customarily designed and this increases the expense of the bracket members.

Therefore, in spite of extensive research and development in the field of brackets for holding elongated elements there exists a need for a bracket which is more universally adaptable and lower in cost to releasably hold elongated elements of different numbers and shapes secure against wear and noise producing vibration while providing a rugged assembly which can be quickly and easily installed by an assembler. Known brackets while addressing some of the encountered problems do not offer adequate solutions from the standpoint of being adaptable to a large number if not all operational applications.

SUMMARY OF THE INVENTION

It is among the objects of this invention to provide a bracket construction which is universally adaptable to a variety of applications and yet is of simple and versatile construction.

A more specific object of this invention is to provide a basic bracket construction which is capable of securely holding a number of elongated control elements effectively with a minimum of parts while affording selection of the size and/or number of such elements.

For the achievement of these and other objects this invention purposes a bracket construction wherein a clip member has a U-shaped base defined by a web and spaced legs extending from said web, one of the clip member legs terminating in a first lateral extension projecting away from the other clip member leg and the other clip member leg terminating in a second extension having a normal orientation extending generally beyond and spaced from the first lateral extension. The other leg is flexible to allow the second extension to be moved into engagement with the lateral extension.

The extensions are configured to form a releasable interlocking engagement therebetween when they are engaged. A generally U-shaped liner nests within the clip member. The liner has a web engaged with the web of the clip member and spaced clip legs extending generally along respective ones of the legs of the clip member. When the extensions are in engagement the clip member and the liner are held against relative movement in one plane. Means is also provided which is engageable between the clip member and the liner to hold the clip member and liner against relative movement in a direction generally normal to that one plane.

Preferably the bracket includes a clip member and a liner nested within the clip member. The clip member includes a generally U-shaped base having a web and first and second relatively spaced clip legs extending from said web. A receiving member is attached to and extends laterally from the first clip leg and away from the second clip leg. The second clip leg extends beyond the area from which the receiving member extends from the first clip leg and terminates in a locking member. The second clip leg is flexible such that it can be turned or folded over the web of the U-shaped base to engage the locking member with the receiving member. There is means on the locking member and the receiving member which forms an interlock to hold the locking member in engagement with the receiving member. The liner is also generally U-shaped including a liner web in engagement with the clip member web and first and second liner legs extending from the web along the first and second legs of the clip member. The one of the liner legs extending along the first clip member leg terminates short of the extension of the receiving member that projects from the first clip member leg, and the other liner member leg has an extension beyond the terminal end of the first liner member leg and short of the locking member of the second liner leg and is flexible along with the second locking member leg to fold into engagement with the terminal end of the first liner leg. In that construction the liner and the locking member are movable between a first position whereby both present an open end spaced from their respective web portions for receipt of elongated elements in the liner and a second position closing the end of the U's to hold the elongated elements captive in the liner.

More specifically, the engagement of the locking member and the receiving member hold the clip member and the liner against relative movement in X and Y directions and means engaged between the clip member and the liner holds the clip member and the liner against movement in a Z direction. The arrangement for holding the clip member and the liner against movement in the Z direction includes spaced tabs on one of the clip member or liner which engage edges on the other of the clip member or the liner.

BRIEF DESCRIPTION OF THE DRAWINGS

FIG. 1 is a side elevational view of the clip member and flexible liner with the liner removed from the clip member.

FIG. 2 is a perspective view of the clip member and flexible liner assembly.

FIG. 3 is a side elevational view of the clip member and flexible liner locked in the engaged position and securing elongated members or cables in the closed cavity.

FIG. 4 is a side elevational view of the clip member and flexible liner in the open position.

DESCRIPTION OF THE PREFERRED EMBODIMENT

With particular reference to the drawings, a preferred embodiment of the bracket 12 of this invention is illustrated mounted and supporting a number of control elements 10, 14. The invention will be described in use supporting a number of brake line control cables. It will be appreciated, however, that it is applicable to the support of any type of elongated element.

In FIG. 1, four elongated brake control elements 10 are illustrated as supported in the bracket 12. For illustrative purposes a fifth tubular element 14 is also shown supported in the bracket 12, demonstrating the adaptability of the bracket construction. The bracket 12 includes a clip member 16 and a liner 18 nested within the clip member. The clip member 16 includes a means such as apertures 76, 78 by which the bracket 12 can be mounted to the surface 20 of a mounting portion 19. In the brake line application, surface 20 will be part of the structure of an automobile and the attachment is accomplished by means of a nut and bolt attachment 22 to ledge 24 projecting from surface 20. The construction of the bracket 12 in this regard will be described more completely hereinafter.

At this point it will be noted that with the two piece bracket 12 a considerable degree of versatility is achieved but without sacrificing any security in the installation. More particularly the clip element 16 is a single universal component that can be used with any one of a plurality of the liners 18 that are custom sized and configured internally as required to accommodate the various sized elements and number of elements to be supported. That is, the inner surface which actually engages the elongated elements 10 and 14 being supported can be any desired configuration and define any desired inner area while the outer surface which engages the clip member conforms to the clip member for a tight, secure nesting fit. The bracket 12 relies on the clip member 16 for its structural integrity while the liner 18 insures secure capture of the supported elements. This construction also allows selection of different materials for the clip member 16 and the liner 18 so that materials particularly adaptable to each function can be selected. For example, the clip member 16 can be made of a high impact nylon for the necessary rigidity and structural integrity. The liner 18 can than be made of a softer more flexible or compressible material such as a nitrile rubber to conform to the nested pattern of the elements 10, 14 being supported. That combination will result in a desired structurally strong reliable mounting bracket which securely holds the elongated control elements in place.

With that general description of the bracket 12, and its intended use, a more specific description of a preferred embodiment will now be made.

As best shown in FIGS. 1, 3, and 4, the clip member 16 includes a generally U-shaped base defined by a web 24 and two, relatively spaced first and second clip legs 26 and 28. The upper end of leg 26, as viewed in the drawings, carries a lateral projection 30 extending from an area A thereof, which extends generally parallel to the plane of web 24 and defines a lock receiving member as will be pointed out later. The other leg 28 extends beyond the upper extension of leg 26 and terminates in a specially formed end 32, which forms a locking member as will be apparent as this description progresses. Leg 28 includes a reduced thickness section 34 which provides a flexible portion serving as hinge section about which leg 28 can be bent.

Referring now to FIGS. 3 and 4, the edges 36 and 38 of receiving member 30 are pointed and together comprise free and inner ends, respectively. The edges are defined by angular surfaces 36a and 38a and horizontal surfaces 36b and 38b. The edges 36, 38 extend the length of the lock receiving member 30. Locking member 32 includes edges 40 and 42 (comprising locking member free and inner ends, respectively) which also extend the length of the locking member and are hooked shaped to be generally complimentary to and mate with edges 36 and 38. Edge 42 includes angularly related surfaces 42a and 42b corresponding to the angular relation of surfaces 38a and 38b. Edge 42 can then fit snugly with edge 38. Edge 40 although configured generally complimentary to edge 36 is not an exact fit. Instead it has a generally straight extension 40a from the main body 44 of the locking member 32. Extension 40a terminates in a hook shaped tip 40b which will fit over and under edge 36.

As can be seen in FIGS. 2 and 3, leg 28 can be bent or folded on hinge 34 to bring locking member 32 into engagement with lock receiving member 30. Edge 42 slides along surface 38a until the hook shaped end 42a engages both surfaces 38a and 38b. Continued movement brings end 40 over edge 36 until its hook tip 40b is engaged under surface 36b. The straight extension 40a of edge 40 leaves some clearance between the respective surfaces of edges 40 and 36 which allows edge 40 to move onto and off of edge 36 more readily as compared to a close fit such as that between the other two mating edges.

Referring now to FIGS. 3 and 4, liner 18 is generally U-shaped as is the clip member 16. The liner 18 includes a web 46 and relatively spaced first and second liner legs 48 and 50. The liner 16 is configured to be positioned within the clip member 16 with its legs 48 and 50 extending generally along clip member legs 26 and 28 and its web 46 in engagement with web 24 so that the liner nests snugly within the clip member. The end 52 of liner leg 48 terminates short of (below) the area A at which receiving member 30 is attached to and extends from leg 26. This provides clearance for the locking member 32 to move into and out of engagement with the receiving member 30.

The other liner leg 50 has a terminal end 54 extending beyond (above) the end 52 of leg 26 and receiving member 30. As can be seen in FIGS. 2 and 3, when clip member leg 28 is bent or folded on hinge 34 toward receiving member 30 liner it contacts and causes end 54 to bend with it bringing its edge 56 into engagement with edge 58 completing the closure of the liner 18 onto or over the elongated elements 10 and 14.

The clip member 16 is provided with indentations 60 and 62 extending the length of clip web 24. Liner web 46 is provided with protrusions 64 and 66 (FIG. 4) fitting into indentations 60 and 62. With reference to FIG. 1, with the liner 18 in the clip member 16 the two pieces are held against disengagement in the X and Y directions by the mating protrusions 64, 66 and indentations 60 and 62 and, when closed, the locking member 32.

As another base of structural orientation, it will be noted that webs 24 and 46 are generally planar and their respective planes are generally parallel in a Z direction shown in FIG. 1. Legs 26, 28 and 48, 50 extend generally normal (perpendicular) to the planes of the webs. Receiving member 30 extends generally parallel to the planes of the webs and generally normal to the legs 26, 28.

As can also be seen in FIGS. 1, 2, and 3, the liner 18 is not of the same length as the clip member 16 in the Z direction and an engagement is provided between the clip member and the liner which holds the two pieces against relative movement in the Z direction. Engagement tabs 68 and 70 (shown in FIG. 1) are provided along the opposite, spaced edges 72 and 74 of the legs 26 and 28 of the clip member. The liner legs 48 and 50 fit between those tabs and the liner and clip member are thereby held against relative movement in the Z direction.

Locking member 32 and receiving member 30 each include an aperture 76 and 78, respectively. These apertures come into registry when the locking member is closed onto the receiving member to accommodate mounting the bracket to the surface 20, i.e. through receipt of nut and bolt combination 22.

What is claimed is:

1. A bracket for holding elongated element means comprising, in combination,
    a clip member and a liner nested within the clip member, said clip member including;
    a generally U-shaped base having a clip web and first and second relatively spaced clip legs extending from said clip web,
    a receiving member attached to and extending laterally from an area of said first clip leg and away from said second clip leg,
    said second clip leg extending beyond said area from which said receiving member extends from said first clip leg and terminating in a locking member,
    said second leg including a first flexible portion about which said second leg can be folded over said clip web of said U-shaped base to engage said locking member with said receiving member and
    means on said locking member and said receiving member forming an interlock to hold said locking member in engagement with said receiving member,
    said liner mountable between said first and second clip legs and being generally U-shape including a liner web in engagement with said clip member web and first and second liner legs extending from said clip web along said clip member first and second clip legs,
    the one of said liner legs extending along said first clip member leg having a terminal end terminating short of said area of said first clip member leg from which said receiving member extends and
    said other liner member leg having an extension that projects beyond said terminal end of said one liner member leg and terminating short of said locking member of said second clip leg and being flexible with said second locking member leg to fold therewith into engagement with said terminal end of said first liner leg to define an elongated element receiving space,
    whereby said liner extension and said locking member are movable between a first position whereby both define an open end spaced from their respective web portions for receipt of elongated elements in said liner and a second position closing said first and second open ends of said U's to hold said elongated element means captive in said liner elongated element receiving space.

2. The bracket of claim 1 having a longitudinal axis extending parallel to the elongated element means held therein further including;
    means engaged between said clip member and liner for holding said clip member and liner against relative movement therebetween in the direction of said longitudinal axis of the elongated element means.

3. The bracket of claim 1 wherein;
    said webs are generally planar and generally parallel one to the other, said first and second legs of said clip member and said liner extend generally normal to the planes of said webs,
    said receiving member is generally planar and extends generally parallel to the planes of said webs, and
    said locking member is generally planar, and when said clip member is in said first position said locking member extends generally parallel to the extension of said clip member first and second legs and when said locking member is in said second position said locking member extends over said receiving member.

4. The bracket of claim 3 wherein;
    said receiving member includes a free end and an inner end attached to the first leg of said clip member and both said free and inner ends including a hook shaped projection,
    said locking member includes a free end and an inner end attached to the second leg of said clip member and both of said locking member free and inner ends including hook shaped projections complementary to and engageable with the hook shaped projections on said receiving member, and
    said hook shaped projections of said receiving and locking members interlocking when said receiving and locking members engage each other.

5. The bracket of claim 2 wherein;
    the engagement of said locking member and said receiving member holds said clip member and said liner against relative movement in X and Y directions and said means engaged between said clip member and said liner for holding said clip member and said liner against movement in a Z direction has a releasable connection therebetween.

6. The bracket of claim 2 wherein;
    the engagement of said locking member and said receiving member hold said clip member and said liner against relative movement in X and Y directions and said means engaged between said clip member and said liner holds said clip member and said liner against movement in a Z direction.

7. The bracket of claim 6 wherein said means holding said clip member and said liner against movement in said Z direction comprises spaced tabs on one of said clip member or liner and engaging edges on the other of said clip member and said liner.

8. The bracket of claim 7 wherein said tabs are on said clip member.

9. The bracket of claim 8 including means on said clip member for connecting said bracket to a mounting member.

10. The bracket of claim 9 wherein said means for connecting said bracket to said mounting member comprises apertures in both said receiving member and locking member which register one with the other when said receiving locking members are in said 11. A bracket comprising, in combination, a clip member having a U-shaped base defined by a clip web and spaced clip legs extending from said web defining a liner receiving space, one of said clip member legs terminating in a lateral first extension projecting away from other clip member leg and the other of said clip member legs terminating in a second extension having a normal orientation extending generally beyond and spaced from said lateral first extension, and said other leg being flexible to allow said second extension to be moved into engagement with said lateral first extension, means on said lateral and second extensions forming a releasable interlocking engagement therebetween when engaged, a liner having a generally U-shape and nested within said liner receiving space of said clip member, said liner having a liner web engaged with the clip web of said clip member and spaced liner legs extending generally along respective ones of the clip legs of said clip member, when said second extension and lateral first extension of said clip member are in engagement to hold said liner against relative movement in one plane, and means engaged between said clip member and said liner holding said clip member and said liner against relative movement in a direction generally normal to said one plane.

12. The bracket of claim 11 including means on said clip member for connecting said bracket to a mounting member.

13. The bracket of claim 12 wherein said means for connecting said bracket to a mounting member comprises apertures in both said first lateral extension and second extension which register one with the other when said lateral and second extensions are engaged.

14. A two piece bracket for holding elongated member means comprising in combination:

a clip member including a U-shaped base having a clip web, first and second clip legs extending from said web to define an open ended liner receiving space, therebetween having a first open end and a releasable locking means connectable in a first closure position between said clip legs to close said open end of said liner receiving space; and a liner member of resilient compressible material configured to removably nest within said liner receiving space of said clip member including a U-shaped base, a liner web, first and second liner legs extending from said liner web to define an elongated element means receiving space having a second open end between said first and second liner legs and an extension member connectable in a second closure position between said liner legs to close said second open end, said releasable clip member locking means when in said first closure position retaining said liner extension member in said second closure position.

* * * * *

UNITED STATES PATENT AND TRADEMARK OFFICE
CERTIFICATE OF CORRECTION

PATENT NO. : 5,301,917
DATED : April 12, 1994
INVENTOR(S) : Edward P. Dyer

It is certified that error appears in the above-identified patent and that said Letters Patent is hereby corrected as shown below:

Claim 10, Column 7, line 12, after "receiving" insert --and--;

and after the second occurrence of "said" insert

--second position.--

Signed and Sealed this

Sixth Day of September, 1994

Attest:

BRUCE LEHMAN

Attesting Officer  Commissioner of Patents and Trademarks